Feb. 18, 1930.                R. H. WAPPLER                1,747,407
                         CATHETERIZING INSTRUMENT
                           Filed July 20, 1928
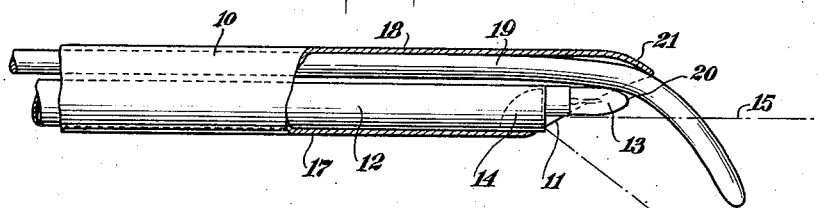
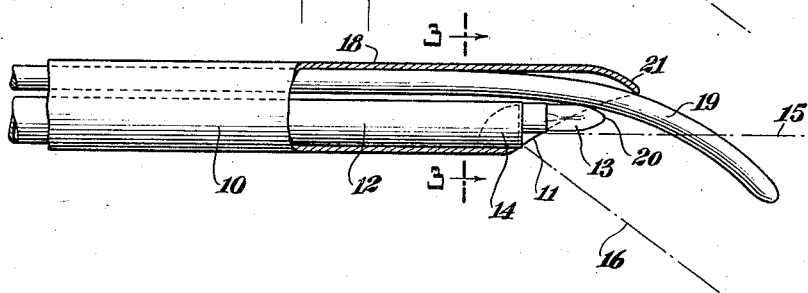
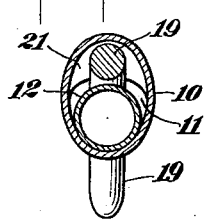
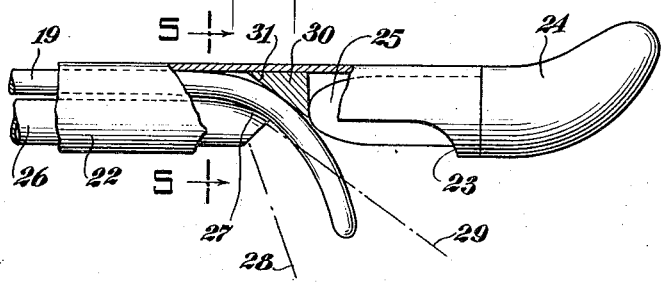
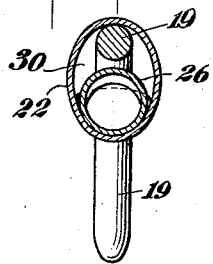
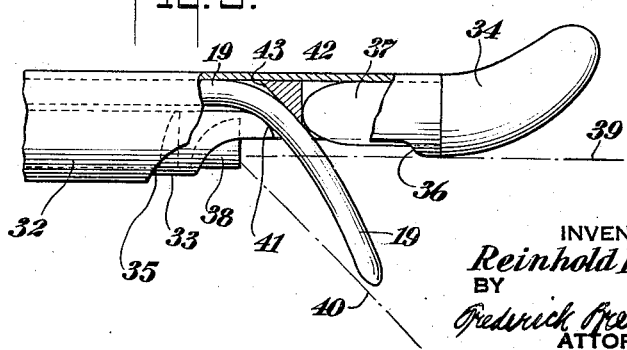
INVENTOR
Reinhold H. Wappler,
BY
Frederick Breitenfeld
ATTORNEY Patented Feb. 18, 1930

1,747,407

UNITED STATES PATENT OFFICE

REINHOLD H. WAPPLER, OF YONKERS, NEW YORK

CATHETERIZING INSTRUMENT

Application filed July 20, 1928. Serial No. 294,235.

My present invention relates generally to surgical instruments, and has particular reference to the endoscopic type of instrument which is used for catheterizing purposes.

It is a general object of my invention to provide a catheterizing instrument having improved qualities of compactness, strength, and reliability, wherein the guidance and control of a catheter into and across an illuminated field of vision is greatly facilitated.

An important object of my invention is to provide an instrument of extreme simplicity of construction, means being provided for obviating the necessity for complicated and delicate mechanism of the character heretofore generally employed for controlling the guidance and deflection of the inserted catheter.

An instrument constructed in accordance with my present invention embodies an endoscopic tube with a fenestra toward one side of its inner end, and means for providing illuminated vision through said tube of the field outside of said fenestra, said means including a tubular element within the endoscopic tube. It is a particular feature of my invention to construct and arrange the parts just mentioned in such a manner that a catheter may be efficiently and controllably guided through the endoscopic tube and out of said fenestra into the illuminated and visible field.

More particularly, it is a feature of my invention to construct the inner tubular element of smaller cross-section than that of the endoscopic tube, and to position the inner element away from the unfenestrated side of the endoscopic tube, thereby providing a space which permits passage of a catheter therethrough. A further feature lies in providing means at the inner end of said space for deflecting and guiding the inserted catheter out of said fenestra and into said illuminated field.

It is another feature of my invention to provide the foregoing construction and arrangement in such a manner that the catheter will enter the field at an efficient and proper point with respect to the objective lens of the sighting means. More particularly, my invention is such that the inserted catheter is deflected into the illuminated field at a point properly and suitably in advance of the objective of a telescopic tube.

Another feature lies in providing an arrangement whereby the longitudinal adjustment of the inner tubular element will automatically control the degree of deflection of the catheter. In this way all auxiliary mechanism for deflecting and guiding the catheter may be dispensed with and as a result the entire construction may be more compact and staunch.

For the attainment of the foregoing objects and such other objects as may hereinafter appear or be pointed out, I have constructed several embodiments of my invention and illustrated in the accompanying drawings in which—

Figure 1 is a longitudinal view, partly in section, of the inner end of an instrument of the present character;

Figure 2 is a view similar to Figure 1 showing an inserted catheter adjusted to a different deflection;

Figure 3 is a cross-sectional view taken substantially along the line 3—3 of Figure 2;

Figure 4 is a view similar to Figures 1 and 2 showing a modification;

Figure 5 is a cross-section taken substantially along the line 5—5 of Figure 4; and Figure 6 is a view similar to Figure 4 showing a further modification.

In Figures 1 and 2 I have shown one type of endoscopic tube in combination with one type of sighting and illuminating means. The endoscopic tube 10 is shown as elliptical or oval in cross-section, but this shape is not absolutely essential. Its inner end is beveled to provide an oblique fenestra 11 which is obviously arranged toward one side of the inner end of the tube 10.

Within the tube 10 I have shown a tubular element 12 which may be constructed in the manner shown by me in my Patent No. 1,680,491. A lamp 13, of smaller cross-section than that of the tubular element 12, is mounted upon the inner end of the latter and wholly within the calibre of the latter. Immediately behind the lamp 13 is an objective lens 14 which commands a field of vision obliquely forward and substantially defined by the limits 15 and 16. The conical field defined is efficiently illuminated by the lamp 13.

The tubular element 12 is of such a size that when it is arranged along the relatively short side 17 of the tube 10, a space is provided between the element 12 and the relatively long and unfenestrated side 18 of the tube 10, which space permits the passage of a catheter 19 therethrough. Such catheter is of the well known type which is sufficiently rigid to be guided longitudinally by pressure at the rear end and which is at the same time sufficiently bendable to permit guidance thereof by deflection of the forward end.

In accordance with my invention I provide means at the inner end of this catheter space for guiding the catheter efficiently and controllably out of the fenestra 11 and into the field of vision. In the form of Figures 1 and 2 I make use of the rounded tip 20 of the lamp 13, this rounded tip being obviously at the extreme inner end of the tubular element 12. I also bend the extreme end 21 of the wall 18 in the direction of the fenestra 11, thereby providing an abutment which extends from the wall 18 toward the field of vision.

When the instrument of Figures 1 and 2 is employed, the catheter 19 is inserted and passed through the space provided therefor, and at the inner end of this space the catheter encounters the abutment 21. This abutment presents an inclined surface to the tip of the catheter and deflects the latter against the rounded tip 20 of the tubular element 12 and thence across the inner end of the tubular element 12 and into the field of vision. This deflection and guidance is staunch and far more efficient than the deflection heretofore generally effected by separate and delicate mechanism which must be independently controlled from the rear end of the device. It is to be noted that the tip of the catheter 19 enters the field of vision at a proper distance from the objective 14, thereby greatly improving the visibility and accurate control of this operative tip of the catheter.

Upon reference to Figure 2 it will be noted how a slight retraction of the inner element 12 will effect a less deflection of the catheter 19. The element 12 is longitudinally adjustable within the endoscopic tube 10 and this slight retraction is an extremely simple matter. By thus retracting the element 12, the distance between the rounded tip 20 and the abutment 21 is slightly increased, and as a result, the deflection of the catheter 19, when the tip thereof encounters the abutment 21, is slightly less in degree. This control of the degree of deflection is equally as staunch and efficient as the entire construction hereby provided for guiding and deflecting the catheter.

In Figure 4 I have shown an endoscopic tube 22 which is of a slightly different character and which is provided with a fenestra 23 on one side of the inner end. The extreme tip of the endoscopic tube 22 is in this case sealed and capped as at 24 to provide a nose which facilitates insertion in a well known manner. Mounted in the nose 24 and extending rearwardly is a lamp 25, the latter having its main portion positioned at the forward end of the fenestra 23 so as to illuminate the field of vision outside of said fenestra.

In the instrument of Figure 4 I have provided an inner tubular element 26 positioned away from the unfenestrated wall of the tube 22 and terminating adjacent to the rear portion of the fenestra 23. The extreme inner end of the tubular element 26 is rounded as at 27 to provide the equivalent of the rounded tip 20 previously referred to. The field of vision commanded by the telescopic tube 26 is substantially defined by the limits 28 and 29. This field of vision is more lateral than the previous field and does not include the directly forward view which the sight device of Figures 1 and 2 renders possible.

In the construction of Figure 4, I provide an abutment 30 immediately to the rear of the lamp 25 and arranged at the inner end of the space between the tubular element 26 and the unfenestrated wall of the tube 22. The abutment 30 may be suitably fixed to project from the unfenestrated wall across the inner end of the catheter space. It is to be noted that this abutment presents an inclined guiding surface 31 to the inserted catheter, and that it extends across the endoscopic tube 22 to a point slightly in front of the tubular element 26.

The catheter 19, when inserted into the instrument of Figure 4, will have its foremost tip encounter the inclined guiding surface 31, and the forward portion of the catheter will thereby be deflected against the rounded tip 27, thence across the inner end of the tubular element 26 and into the illuminated field of vision. The efficient guidance and deflection of the catheter is thus effected without any special mechanism whose movable parts would require special manipulation and would add to the bulk and complexity of the whole instrument.

In Figure 6 I have shown an endoscopic tube 32 which is similar in construction to the tube 22 of Figure 4, and with this tube I have shown a telescopic tubular element 33 embodying an objective system similar to that of Figures 1 and 2.

In this construction, the cross-sectional area of the body of the tube 32 is slightly greater than the cross-sectional area of the nose 34. A fenestra arranged along the side as in Figure 4 commences at the rear point 35 of the relatively large cross-section and terminates at the forward point 36 of the relatively small cross-section. A lamp 37 extends rearwardly from the nose 34 similar to the lamp 25 of Figure 4.

The inner tubular element 33 is provided with an objective lens 38, which lens commands a field of vision substantially defined by the limits 39 and 40. It will be noted that this field of vision is similar to the field of Figures 1 and 2, and that the inner limit 39 thereof extends directly forwardly. It is for this reason that the nose portion 34 is made of smaller cross-section, such nose portion being thus positioned immediately outside of the inner limit 39.

A rounded tip 41 is provided upon the tubular element 33; and an abutment 42 is provided to the rear of the lamp 37. The abutment 42 presents an inclined guiding surface 43 to the inserted catheter 19, as set forth hereinbefore.

One position of the catheter 19 is shown in Figure 6, and it will be noted that here, too, the catheter enters the field of vision in an efficient and proper direction suitably in advance of the objective 38. If the deflection is to be decreased in degree, the tubular element 33 may be slightly retracted, and by thereby spacing the rounded tip 41 from the inclined guiding surface 43, the catheter may be made to enter the field of vision at a less sharp angle.

It will thus be seen that I have provided an instrument of extremely simple structural characteristics, of maximum compactness, and with capabilities of catheter guidance and control which are not only simple and staunch but also specially reliable. It will also be noted that these advantageous results have been attained without any resort to delicate and independently actuated deflecting mechanism which would increase cost, bulk, and complexity of construction and use.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

I claim:

1. In a catheterizing instrument, an endoscopic tube having a fenestra toward one side of its inner end, means for providing illuminated vision through the endoscopic tube of the field outside of said fenestra, said means including a tubular element in the endoscopic tube and of smaller cross-section than the latter, said element being spaced from the unfenestrated side of the endoscopic tube to permit passage of a catheter through said space, and means at the inner end of said space for guiding an inserted catheter across the front end of said tubular element and thence into said illuminated field.

2. In a catheterizing instrument, an endoscopic tube having a fenestra toward one side of its inner end, means for providing illuminated vision through the endoscopic tube of the field outside of said fenestra, said means including a tubular element in the endoscopic tube and of smaller cross-section than the latter, said element being spaced from the unfenestrated side of the endoscopic tube to permit passage of a catheter through said space, and means at the inner end of said space for guiding an inserted catheter across the front end of said tubular element and thence into said illuminated field, said last-named means comprising an abutment projecting across said space from said unfenestrated side.

3. In a catheterizing instrument, an endoscopic tube having a fenestra toward one side of its inner end, means for providing illuminated vision through the endoscopic tube of the field outside of said fenestra, said means including a tubular element in the endoscopic tube and of smaller cross-section than the latter, said element being spaced from the unfenestrated side of the endoscopic tube to permit passage of a catheter through said space, and means at the inner end of said space for guiding an inserted catheter across the front end of said tubular element and thence into said illuminated field, said last-named means comprising an abutment projecting across said space from said unfenestrated side and constructed to present an inclined guiding surface to said inserted catheter.

4. In a catheterizing instrument, an endoscopic tube having a fenestra toward one side of its inner end, means for providing illuminated vision through the endoscopic tube of the field outside of said fenestra, said means including a tubular element in the endscopic tube and of smaller cross-section than the latter, said element being spaced from the unfenestrated side of the endoscopic tube to permit passage of a catheter through said space, and an abutment at the inner end of said space and encounterable by an inserted catheter to deflect and guide the latter out of said fenestra and into said illuminated field, said abutment extending from said unfenestrated side to a point in front of said tubular element.

5. In a catheterizing instrument, an endoscopic tube having a fenestra toward one side of its inner end, means for providing illuminated vision through the endoscopic tube of the field outside of said fenestra, said means including a tubular element in the endoscopic tube and of smaller cross-section than the latter, said element being spaced from the unfenestrated side of the endoscopic tube to permit passage of a catheter through said space, and means at the inner end of said space for deflecting and guiding an inserted catheter out of said fenestra and into said illuminated field, said last-named means comprising a rounded end on said tubular element and an abutment spaced from said rounded end and projecting from said unfenestrated side.

6. In a catheterizing instrument, an endoscopic tube having a fenestra toward one side of its inner end, means for providing illuminated vision through the endoscopic tube of the field outside of said fenestra, said means including a longitudinally shiftable tubular element in the endoscopic tube and spaced from the unfenestrated side of the latter to permit passage of a catheter through said space, and an abutment at the inner end of said space and encounterable by an inserted catheter to deflect the latter against and across the inner end of said tubular element and thence into said illuminated field, whereby the degree of catheter deflection may be controlled by shifting said tubular element.

7. In a catheterizing instrument, an endoscopic tube having a fenestra toward one side of its inner end, a telescopic tube within the endoscopic tube and, commanding an obliquely forward field of vision outside of said fenestra, said telescopic tube being spaced from the unfenestrated side of the endoscopic tube to permit passage of a catheter through said space and thence out of said fenestra and into said field.

8. In a catheterizing instrument, an endoscopic tube having a fenestra toward one side of its inner end, a telescopic tube within the endoscopic tube and commanding an obliquely forward field of vision outside of said fenestra, illuminating means in advance of and spaced from said telescopic tube, the latter being spaced from the unfenestrated side of the endoscopic tube to permit a catheter to pass through said space, and an abutment behind said means and encounterable by said catheter for deflecting the latter out of said fenestra and into the illuminated field of vision.

9. In a catheterizing instrument, an endoscopic tube having a fenestra toward one side of its inner end, a longitudinally shiftable telescopic tube within the endoscopic tube and commanding an obliquely forward field of vision through said fenestra, a lamp in advance of and spaced from the telescopic tube, said lamp being out of the field of vision and illuminating the latter, the telescopic tube being spaced from the unfenestrated side of the endoscopic tube to permit passage of a catheter through said space, and an inclined abutment behind the lamp and encounterable by said catheter, said abutment being adapted to deflect the catheter against and across the front end of the telescopic tube and thence into said illuminated field, whereby the degree of deflection may be controlled by shifting the telescopic tube.

10. In a catheterizing instrument, an endoscopic tube having an obliquely fenestrated end, means for providing illuminated vision through the endoscopic tube of an obliquely forward field of vision outside of said fenestra, said means comprising a telescopic tube with a lamp at its forward end, said telescopic tube being spaced from the longest wall of the endoscopic tube to provide a passage for a catheter, and means at the end of said passage for deflecting said catheter into the illuminated field of vision.

11. In a catheterizing instrument, an endoscopic tube having an obliquely fenestrated end, means for providing illuminated vision through the endoscopic tube of an obliquely forward field of vision outside of said fenestra, said means comprising a telescopic tube with a lamp at its forward end, said telescopic tube being spaced from the longest wall of the endoscopic tube to provide a passage for a catheter, and means at the end of said passage for deflecting said catheter into the illuminated field of vision, said last-named means comprising an abutment formed on the tip of said endoscopic tube and projecting toward said field.

12. In a catheterizing instrument, an edoscopic tube having an obliquely fenestrated end, means for providing illuminated vision through the endoscopic tube of an obliquely forward field of vision outside of said fenestra, said means comprising a telescopic tube with a lamp at its forward end, said telescopic tube being spaced from the longest wall of the endoscopic tube to provide a passage for a catheter, and means at the end of said passage for deflecting said catheter into the illuminated field of vision, said last-named means comprising an abutment formed on the tip of said endoscopic tube and projecting toward said field, said abutment being inclined and adapted to deflect the catheter against and across the tip of said lamp.

In witness whereof, I have signed this specification this 18th day of July, 1928.

REINHOLD H. WAPPLER.